Patented Dec. 17, 1946

2,412,816

UNITED STATES PATENT OFFICE 2,412,816

POLYMETHINE DYESTUFFS

John David Kendall and Harry Derek Edwards, Ilford, England, assignors to Ilford Limited, Ilford, England, a British company No Drawing. Application December 17, 1943, Serial No. 514,668. In Great Britain January 1, 1943

11 Claims. (Cl. 260—240)

This invention relates to polymethine dyestuffs and particularly to the production of dicarbocyanine and similar dyestuffs which serve as optical sensitisers for silver halide photographic emulsions.

In co-pending application Serial No. 514,669, filed December 17, 1943, corresponding to British specification No. 15/43, there is described the preparation of compounds of the general Formula I:

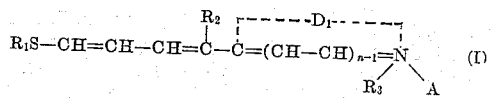

where $R_1$ is an alkyl group, $R_2$ is a hydrogen atom or an alkyl or aralkyl group, and $R_3$ is an alkyl or aralkyl group (including unsaturated groups of this type such as the allyl group and substituted groups of this type such as hydroxyalkyl groups), A is an acid radicle, $D_1$ is the residue of a heterocyclic nucleus, and $n$ is an integer less than 3. In general it is preferred that the groups $R_1$, $R_2$ (if not hydrogen) and $R_3$ should be lower alkyl groups, e. g. methyl and ethyl, and for convenience in preparing the compounds the group $R_1$ is preferably ethyl. The group A in the foregoing formula represents an acid radicle, e. g. chloride, bromide, iodide, alkyl sulphate, p-toluene sulphonate and perchlorate.

In our copending application Serial No. 514,666, filed December 17, 1943, corresponding to British application No. 14/43, there are described the production of compounds of the general Formula A:

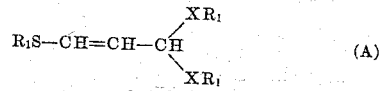

where the groups $R_1$ are alkyl groups and the groups X are both oxygen atoms or both sulphur atoms.

Compounds of the type wherein X is S can be prepared as disclosed in aforesaid applications by treating with an alkyl mercaptan, in the presence of an acid condensing agent, a compound of one of the Formulae B, C, D, or E:

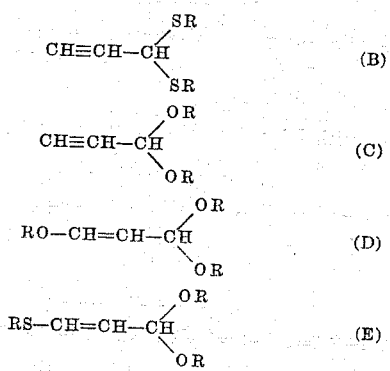

or by treating with an alkyl mercaptan in the presence of a basic condensing agent under pressure, a compound of Formula B.

Compounds of the general Formula B may be obtained by brominating acrolein and treating the product with an alkyl mercaptan followed by heating with an alkali to remove bromine. Compounds of the general Formula C may be converted to compounds of general Formula E by treating them with a sodium alkyl mercaptide and an alkyl mercaptan under pressure.

The most convenient compound of general Formula A to prepare is that in which the groups R are ethyl groups since ethyl mercaptan is the most convenient of the alkyl mercaptans to employ. In using the compounds of general Formula A as dyestuff intermediates the condensation to produce dyestuffs may eliminate all the —SR groups so that the nature of the R group is not then of importance.

The acid condensing agent may be any strongly acidic substance; sulphuric acid and zinc chloride have been found very suitable.

According to the present invention, a compound of the general Formula A is converted to a valuable dyestuff intermediate by condensing it in acid conditions with an alkyl, substituted alkyl, aralkyl or substituted aralkyl quaternary salt of a heterocyclic nitrogen base containing a reactive methylene group (including a methyl or mono-substituted-methyl group) in the alpha or gamma position to the heterocyclic quaternary nitrogen atom.

The condensation is preferably effected by heating the reactants together in the presence of a solvent for the reactants and in the presence of a compound capable of reacting with mercaptan or alcohol split off during the reaction. It is found that acetic anhydride is particularly suitable in serving both purposes.

The course of the reaction is believed to be as follows:

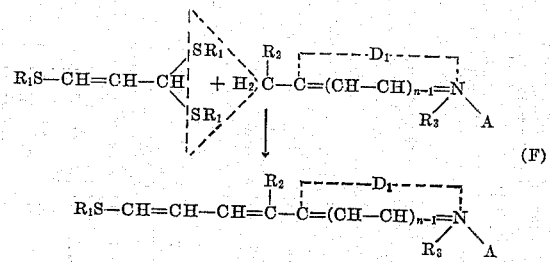

$D_1$ in the foregoing formula is the residue of a heterocyclic nitrogen compound. Examples of suitable heterocyclic nitrogen compounds are substituted and unsubstituted thiazoles, thiazolines, oxazoles, oxazolines, selenazoles, selenazolines, pyridine, quinoline, lepidine, indolenine, diazines (e. g. pyrimidine and the diazines described in British patent specification No. 425,609), thiodiazoles and quinazoline and the corresponding substituted and unsubstituted polycyclic compounds such as the benzthiazoles, naphthathiazoles and anthrathiazoles and the corresponding polycyclic oxazoles and selenazoles. Such heterocyclic compounds may contain substituent groups in the benzene nuclei, e. g. alkyl, aryl, amino, hydroxy and alkoxy groups or halogen atoms.

According to the present invention polymethine dyestuffs are obtained by condensing a compound of general Formula I with a compound containing a reactive methylene group or a reactive amino group. More specifically the invention is concerned with compounds which contain methylene groups which are external to a ring system and rendered reactive by the character of the ring system, including such external groups as methyl and mono-substituted methyl which may be written as —$CH_2R$ where R is a hydrogen atom or an alkyl, aryl or aralkyl group, and also methylene groups which form part of a ring system and are rendered reactive by the particular character of the ring system. Specific general classes of compound containing such reactive methylene and amino groups are:

(a) Quaternary salts of heterocyclic nitrogen compounds containing a substituent methylene, methyl or mono-substituted methyl group or an amino group in the α or γ position to the quaternary nitrogen atom. Examples of compounds of this type are those of the character defined in or an alkyl, aryl or aralkyl group. Examples are rhodanic acid (2-thio-4-keto-tetrahydro thiazole), oxarhodanic acid (2-thio-4-keto-tetrahydro oxazole), and the N-alkyl, N-aryl and N-aralkyl derivatives of such compounds, oxindoles, pyrazole-5-ones, hydantoin, thiohydantoin, ψ-hydantoin and ψ-thio-hydantoin.

(c) Carbocyclic compounds containing a ketomethylene group, e. g. 1.3-indane-dione and the hydrindones.

(d) Compounds of the general type (b) above, but which contain a substituent

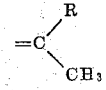

grouping (R being hydrogen or an alkyl, aryl or aralkyl group) described in U. S. P. No. 2,213,986.

(e) Hydrazines and substituted hydrazines.

When employing compounds of type (a) the products obtained are dicarbocyanine dyes. By using a compound of type (a) in which the heterocyclic nucleus is the same as that present in the intermediate of general Formula I, symmetrical dicarbocyanine dyes may be obtained, but the present invention presents the important advantage that it affords a simple and practical method of obtaining the unsymmetrical dicarbocyanine dyes. The reaction with a compound of class (a) is typified by the following general Equation E1:

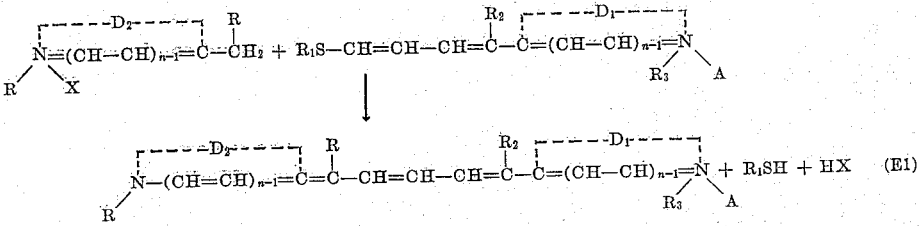

which the heterocyclic nucleus is any of those listed above in connection with the general Formula I. The acid radicle of the quaternary salt may be any of those listed above in connection with the group A in Formula I.

(b) Five-membered ring compounds of the general Formula II:

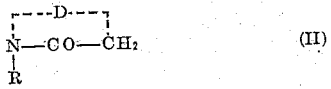

where D is the residue of a heterocyclic nitrogen ketomethylene ring and R is a hydrogen atom Where the compound of class (a) contains a reactive $NH_2$ group instead of the $CH_2R$ group the product contains an =N— atom instead of the

group shown above.

The reaction with a compound of class (b) is typified by the following general Equation E2:

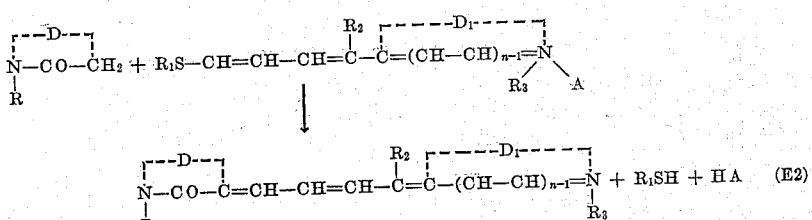

The reaction with a compound of class (c) is typified by the following general Equation E3:

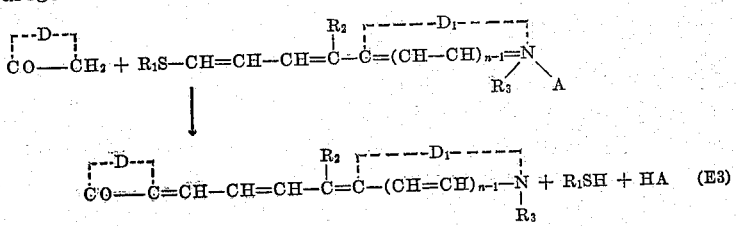

The reaction with a compound of class (d) is typified by the following general Equation E4:

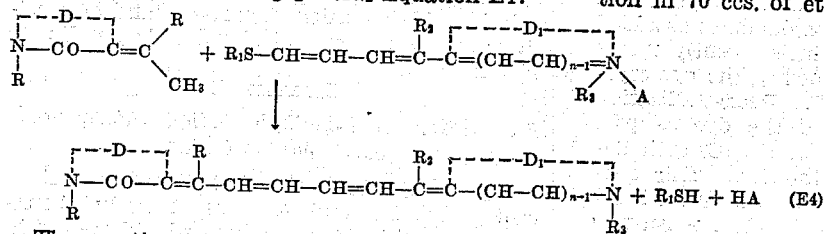
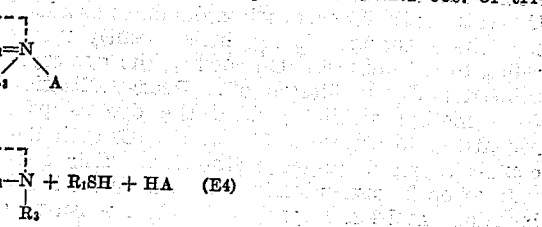

The reaction with a compound of class (e) is typified by the following general Equation E5:

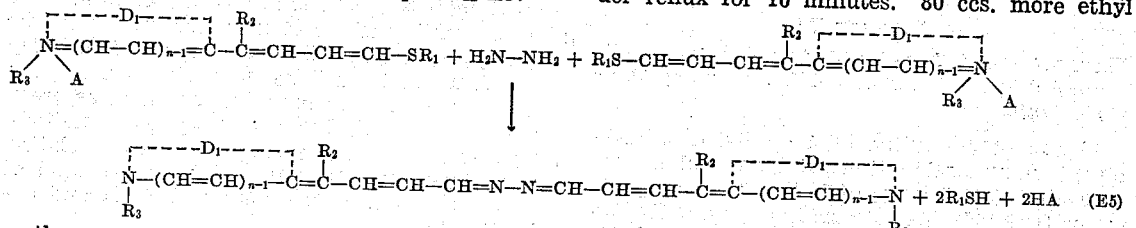
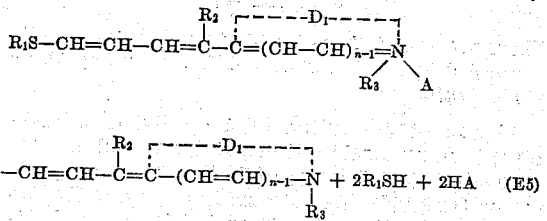

or the mono or di HA salt of the above.

In the above formulae and equations R, $R_1$, $R_2$, $R_3$, $D_1$, A, and X have the same values given in Formula I and $D_2$ has the same values as $D_1$.

When employing compounds of type (b) such as rhodanic acid or oxarhodanic acid or the corresponding N-substituted compounds, the resulting product contains a thio group and can be further reacted in a manner analogous to that described in U. S. application No. 186,251, corresponding to B. P. No. 489,335.

The condensation may conveniently be effected by heating the reagents together in the presence of a base, for example, an organic base such as pyridine or triethylamine or an inorganic base such as an alcoholic solution of sodium acetate.

The following examples illustrate the invention. The process of Examples I to V, VII to XI, XIV and XV proceeds in accordance with Equation E1; that of Example VI proceeds in accordance with Equation E2; that of Example XII proceeds according to Equation E1 as modified by the use of a reactive amino group; that of Example XIII proceeds in accordance with Equation E3; that of Example XV in accordance with Equation E4 and that of Example XVII in accordance with Equation E5.

EXAMPLE I

*Preparation of 2-methyl-1'-β-hydroxy ethyl thia-(4') quino dicarbocyanine iodide*

1.93 gms. of 1-ω-ethyl-thio butadienyl benzthiazole methiodide and 3.15 gms. of lepidine-β-hydroxy ethiodide were warmed into solution in 70 ccs. ethyl alcohol, 2.1 ccs. of triethylamine were added and the whole boiled gently under reflux for 10 minutes. After 80 ccs. more ethyl alcohol and 0.7 cc. triethylamine were added the mixture was allowed to cool, when the dye crystallised out. It was filtered off, and washed with ethyl alcohol, water, ethyl alcohol again, and finally ether. Recrystallisation from methyl alcohol solution yielded the dye as bronze crystals, M. pt. 200° C. with decomposition. This dyestuff when incorporated in a gelatino silver iodo-bromide emulsion imparts a band of sensitivity with a maximum at 7700 A.

EXAMPLE II

*Preparation of 2.2'-dimethyl thiaoxadicarbocyanine iodide*

1.93 gms. of 1-ω-ethyl-thio butadienyl benzthiazole methiodide and 2.75 gms. of 1-methyl benzoxazole methiodide were warmed into solution in 70 ccs. of ethyl alcohol. 2.1 ccs. of triethylamine were added and the whole boiled under reflux for 10 minutes. 80 ccs. more ethyl alcohol and 0.7 cc. of triethylamine were added. On cooling, the dye crystallised and was filtered off, and washed well with ethyl alcohol, water and ether. It had a melting point of 263° C. with decomposition. This dyestuff when incorporated in a gelatino silver iodobromide emulsion imparts a band of sensitivity with a maximum at 6900 A.

EXAMPLE III

*Preparation of 2-methyl 1'-ethyl thia(2') quino dicarbocyanine iodide*

1.93 gms. of 1-ω-ethyl-thio butadienyl benzthiazole methiodide and 1.5 gms. of quinaldine ethiodide were boiled gently under reflux until mostly dissolved in 150 ccs. of ethyl alcohol. 2.1 ccs. of triethylamine were added and the heating continued for 12 minutes. The dye crystallised from the solution and after cooling was filtered off. Recrystallisation from methyl alcohol yielded the dye as green crystals with a gold reflex melting at 225° C. with decomposition. This dyestuff when incorporated in a gelatino silver iodobromide emulsion imparts a band of sensitivity with a maximum at 7150 A. and extending to 7700 A.

EXAMPLE IV

*Preparation of 2-methyl 1':3':3'-trimethyl thiaindodicarbocyanine iodide*

1.93 gms. of 1-ω-ethyl-thio butadienyl benzthiazole methiodide and 1.5 gms of 2:3:3-trimethyl indolenine methiodide were boiled under reflux with 100 ccs. ethyl alcohol. 80 ccs. of a 2% alcoholic solution of anhydrous sodium acetate was added and the heating continued for 12 minutes. On allowing to cool, the dye crystallised and was filtered off. Dilution of the liquors yielded a second crop of crystals. The dye was recrystallised from methyl alcohol solution and obtained as light green crystals, M. pt. 256° C. with decomposition. This dyestuff when incorporated in a gelatino silver iodobromide emulsion imparts a band of sensitivity with a maximum at 6850 A. and extending to 7400 A.

EXAMPLE V

*Preparation of 2-ethyl-1'-methyl oxa(2') quinodicarbocyanine iodide*

10 ccs. of a solution of 1-ω-ethyl-thio butadienyl benzoxazole ethyl-p-toluene sulphonate (prepared as in Example IV of co-pending Application Serial No. 514,669 corresponding to British specification No. 15/43) and .71 gm. of quinaldine methiodide were warmed together on the water bath, 0.7 cc. of triethylamine was added and the reaction mixture boiled gently under reflux for 12 minutes. On cooling, the dye crystallised and was filtered off. Recrystallisation from methyl alcohol yielded the dye as pale greenish-gold crystals. M. pt. 175° C. with decomposition and previous sintering. This dyestuff when incorporated in a gelatino silver iodo-bromide emulsion imparts a band of sensitivity with a maximum at 6900 Å. and extending to 7000 Å.

EXAMPLE VI

*Preparation of 3-methyl-2-thio-4-keto-5-ω-(N-ethyl dihydro benzoxazolylidene) butenylidene rhodanine*

10 ccs. of a solution of 1-ω-ethyl-thio butadienyl benzoxazole ethyl-p-toluene sulphonate (prepared as in Example IV of co-pending application Serial No. 514,669 corresponding to British specification No. 15/43) and 0.37 gm. of N-methyl rhodanic acid were warmed together on the water bath. 0.4 cc. triethylamine was added and the whole refluxed for 10 minutes. The dye was filtered off, after cooling the reaction mixture, recrystallised from methyl alcohol in which it is difficultly soluble, and thus obtained as blue needles. M. pt. 215° C. This dyestuff when incorporated in a gelatino silver iodobromide emulsion imparts a band of sensitivity with a maximum of 6500 Å. and extending to 7000 Å.

EXAMPLE VII

*Preparation of 2-ethyl 1':3':3'-trimethyl oxain-dodicarbocyanine perchlorate*

10 ccs. of a solution of β-ethyl-thio butadienyl benzoxazole ethyl-p-toluene sulphonate (prepared as in Example IV of co-pending application Serial No. 514,669 corresponding to British specification No. 15/43) and 0.75 gm. of 2:3:3-trimethyl indolenine methiodide were warmed together on the water bath. 0.7 cc. of triethylamine was added and the reaction mixture boiled gently under reflux for 12 minutes. The dye was precipitated on cooling by dilution with water, alcohol and ether, and had a M. pt. of 158° C. with decomposition. It was converted to the perchlorate salt by dissolving it in 10 ccs. of methyl alcohol and filtering the hot solution into a hot aqueous solution of potassium perchlorate. The dye crystallised out and was filtered off. After crystallisation from methyl alcohol solution, it was obtained as violet crystals. M. pt. 140° C. with decomposition. This dyestuff when incorporated in a gelatino silver iodo-bromide emulsion imparts a band of sensitivity with a maximum at 6400 Å.

EXAMPLE VIII

*Preparation of 2-methyl-2'-β-hydroxy ethyl thia-dicarbocyanine iodide*

8.6 gms. of 1-ω-ethyl-thio butadienyl benzthiazole methiodide and 7.1 gms. of 1-methyl benzthiazole-β-hydroxy ethiodide were boiled gently together under reflux in 150 ccs. of ethyl alcohol. 7 ccs. of triethylamine was added to the hot solution and the heating continued for 12 minutes. At this stage the dye began to crystallise from the solution. The reaction mixture was poured into a little water, cooled and the dye filtered off. After recrystallisation from methyl alcohol the dye was obtained as shining green crystals. M. pt. 221° C. with decomposition. This dyestuff when incorporated in a gelatino silver iodo-bromide emulsion imparts a band of sensitivity with a maximum at 7050 Å and extending to 7400 Å.

EXAMPLE IX

*Preparation of 2-methyl-2'-ethyl thiaselenodicarbocyanine iodide*

6 gms. of ω-ethyl-thio butadienyl benzselenazole ethiodide and 4.8 gms. 1-methyl benzthiazole methiodide were warmed, till mainly in solution, with 100 ccs. alcohol. 4.6 ccs. of triethylamine were added and the reaction mixture boiled gently under reflux for ten minutes. The dye began to crystallise from the solution, which was diluted with a little water and cooled. The dye was filtered off and thus obtained as green crystals. M. pt. 216° C. with decomposition. This dyestuff when incorporated in a gelatino silver iodo-bromide emulsion imparts a band of sensitivity with a maximum at 7050 Å and extending to 7400 Å.

EXAMPLE X

*Preparation of 2-ethyl 1'-3'-3'-trimethyl seleno-indodicarbocyanine perchlorate*

5.5 gms. of ω-ethyl-thio butadienyl benzselenazole ethiodide, 4.6 gms. of 2:3:3-trimethyl indolenine methiodide and 100 ccs. of ethyl alcohol were warmed together and 4 ccs. of triethylamine then added. After boiling gently under reflux for 10 minutes the hot solution was poured into a warm aqueous solution of potassium perchlorate. The liquors were clarified with acetone, and the dye crystallised from the solution. Recrystallisation of the dyestuff from methyl alcohol gave dark blue crystals. M. pt. 197° C. with decomposition. A second crop from the recrystallisation had M. pt. 204° C. with decomposition. This dyestuff when incorporated in a gelatino silver iodo-bromide emulsion imparts a band of sensitivity with a maximum at 6875 Å and extending to 7000 Å.

EXAMPLE XI

*Preparation of 3-methyl 1':3':3'-trimethyl thiazolino-indo dicarbocyanine perchlorate*

2 gms. of μ-methyl thiazoline and 3.5 gms. of methyl-p-toluene sulphonate were fused together at 100° C. for one hour. The quaternary salt was then warmed, partly into solution, with 7 gms. of 2-ω-ethyl thio butadienyl 1:3:3-trimethyl indolenium perchlorate and 50 ccs. of ethyl alcohol. 6 ccs. of triethylamine was added and the reaction mixture boiled gently under reflux for 10 minutes. The dye bumped out of solution. The reaction mixture was diluted with ethyl alcohol and water, and cooled. By filtration the dye was obtained as bright green crystals. M. pt. 227° C. with decomposition. This dyestuff when incorporated in a gelatino silver iodo-bromide emulsion imparts a band of sensitivity with a maximum at 6200 Å. Used in larger quantity it gives a maximum sensitivity at 6850 Å.

EXAMPLE XII

*Preparation of 2:2'-dimethyl 7-az-thia dicarbocyanine iodide*

0.8 gm. of 1-amino benzthiazole and 1 gm. of methyl-p-toluene sulphonate were fused together at 100° C. for ½ hour. The solid quaternary salt thus formed was dissolved in 60 ccs. of pyridine and 1.6 gm. of 1-ω-ethyl-thio butadienyl benzthiazole methiodide was added. The reaction mixture was heated on a water bath for 15 minutes. Dyestuff recrystallised from the solution, and after dilution with ethyl alcohol and cooling, it was filtered off and washed with ethyl alcohol and ether. The dye was thus obtained as silver-blue crystals. M. pt. 240° C. with decomposition.

EXAMPLE XIII

*Preparation of [1-methyl-dihydroquinolylidene-2]-butenylidene-1':3'-diketo-hydrindene*

0.18 gm. of 2-(ω-ethyl-thio-butadienyl)-quinoline methyl perchlorate and 0.08 gm. of 1:3 indandione were boiled gently under reflux with 7 ccs. of a 2% ethyl alcoholic solution of sodium acetate for one hour. The reaction mixture was cooled and diluted with a little water. The precipitated dyestuff was filtered off and washed with ethyl alcohol, water and ethyl alcohol again. The dye was purified by boiling out with methyl alcohol and filtering hot, when the sparingly soluble dyestuff remained as brown crystals. M. pt. 268° C. with decomposition.

EXAMPLE XIV

*Preparation of 2-methyl-1'-ethyl-5'.6'-benzthia(4')quino dicarbocyanine iodide*

0.19 gm. 1-(ω-ethyl-thio-butadienyl) - benzthiazole methiodide, 0.18 gm. of 5.6-benz lepidine ethiodide and 10 ccs. of ethyl alcohol were boiled gently into solution under reflux. 0.14 cc. of triethylamine was added and the heating continued for 3 minutes. The reaction mixture was then allowed to stand overnight, when the dyestuff crystallised out. It was filtered off and washed with water, ethyl alcohol and ether. Recrystallisation from methyl alcohol yielded the dye as green crystals. M. pt. 180° C. with decomposition.

EXAMPLE XV

*Preparation of 7-[1-methyl-1.2-dihydroquinolylidene - 2] - 2 - [1 - phenyl - 3 - methyl-5-keto-4.5-dihydropyrazolylidene-4]-3.5-heptadiene*

0.35 gm. of 2(-ω-ethyl-thio-butadienyl)-quinoline methyl perchlorate, 0.228 gm. of 1-phenyl-3-methyl - 4 - isopropylidenepyrazole-5-one and 20 ccs. of a 0.5% alcoholic solution of sodium acetate were boiled gently together under reflux for ½ hour. The reaction mixture was cooled and diluted, and the precipitate filtered off and washed with ethyl alcohol. By benzene extraction the dye was obtained as blue crystals, M. pt. 215° C., which gave a blue solution in benzene. This dyestuff, when incorporated in a silver iodobromide emulsion, imparts a band of sensitivity with a maximum at about 7600 Å.

EXAMPLE XVI

*Preparation of 2-β-acetoxyethyl-2'-β-hydroxyethyl-thiadicarbocyanine iodide*

1.6 gm. of 1-methyl benzthiazole β-hydroxyethyl iodide and 25 ccs. of acetic anhydride were boiled gently under reflux until the solid passed into solution. 2 ccs. of β-ethyl-thio-acrolein-acetal were added and the reaction mixture heated for a further 10 minutes. The excess acetic anhydride was then distilled off under reduced pressure, and the residue was washed with petroleum ether and ether. This intermediate was further reacted with 1.6 gm. of 1-methyl benzthiazole-β-hydroxyethyl iodide by heating under reflux with 20 ccs. of ethyl alcohol and 1.4 cc. of triethylamine for 5 minutes. More alcohol was added and the dye solution was filtered hot from a little tarry residue, and poured into an aqueous solution of potassium iodide. The dye precipitated and was filtered off. After recrystallisation from methyl alcohol it was obtained as crystals. M. pt. 210° C. with decomposition. This dyestuff, when incorporated in a silver iodo-bromide emulsion, imparts a band of sensitivity with a maximum at about 7000 Å.

EXAMPLE XVII

*Preparation of the dihydriodide of δ-(1-methyl-dihydrobenzthiazolylidene)-crotonaldazine*

0.13 gm. of powdered hydrazine hydrochloride was boiled gently under reflux with 40 ccs. of a 2% solution of sodium acetate in ethyl alcohol. 1.0 gm. of 1-(ω-ethyl-thio-butadienyl)-benzthiazole ethiodide was added and the heating continued for 30 minutes. A red colour rapidly appeared, and at the end of the heating period the dye solution was filtered hot. On dilution of the filtrate the dye was obtained as dark purple crystals, M. pt. 204° C. with decomposition. Recrystallisation from methyl alcohol yielded the dye as dark brown crystals, M. pt. 208° C. with decomposition.

What we claim is:

1. Process for the production of polymethine dyestuffs which comprises condensing a compound of the general formula:

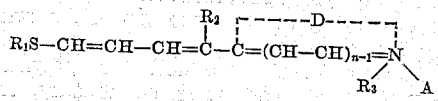

where $R_1$ is an alkyl group, $R_2$ is selected from the class consisting of the hydrogen atom and alkyl and aralkyl groups, $R_3$ is selected from the class consisting of alkyl, aralkyl, allyl and hydroxyalkyl, D is the residue of a heterocyclic nitrogen nucleus usual in the cyanine dye art, A is an acid radicle and $n$ is an integer less than three, with a compound containing a reactive group selected from the class consisting of reactive methylene groups and reactive amino groups.

2. Process for the production of polymethine dyestuffs which comprises condensing a compound of the general formula:

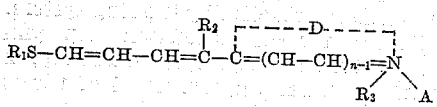

where $R_1$ is an alkyl group, $R_2$ is selected from the class consisting of the hydrogen atom and alkyl and aralkyl groups, $R_3$ is selected from the class consisting of alkyl, aralkyl, allyl and hydroxyalkyl, D is the residue of a heterocyclic nitrogen nucleus usual in the cyanine dye art, A is an acid radicle and $n$ is an integer less than three, with a cyclic compound containing a methylene group rendered reactive by the ring system.

3. Process for the production of polymethine dyestuffs which comprises condensing a compound of the general formula:

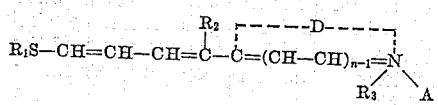

where $R_1$ is an alkyl group, $R_2$ is selected from the class consisting of the hydrogen atom and alkyl and aralkyl groups, $R_3$ is selected from the class consisting of alkyl, aralkyl, allyl and hydroxyalkyl, D is the residue of a heterocyclic nitrogen nucleus usual in the cyanine dye art, A is an acid radicle and $n$ is an integer less than three, with a quaternary salt of a heterocyclic nitrogen compound containing a substituent group selected from the class consisting of methylene and amino groups in one of the $\alpha$ and $\gamma$ positions to the heterocyclic quaternary nitrogen atom.

4. Process for the production of polymethine dyestuffs which comprises condensing a compound of the general formula:

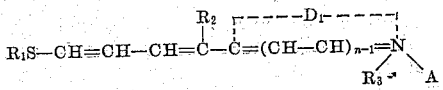

where $R_1$ is an alkyl group, $R_2$ is selected from the class consisting of the hydrogen atom and alkyl and aralkyl groups, $R_3$ is selected from the class consisting of alkyl, aralkyl allyl and hydroxyalkyl, $D_1$ is the residue of a heterocyclic nitrogen nucleus usual in the cyanine dye art, A is an acid radicle and $n$ is an integer less than three, with a compound of the general formula:

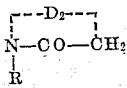

wherein $D_2$ is the residue of a heterocyclic nitrogen ketomethylene ring and R is selected from the class consisting of the hydrogen atom and hydrocarbon groups.

5. Process for the production of polymethine dyestuffs which comprises condensing, in the presence of a base, a compound of the general formula:

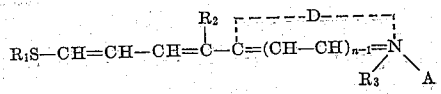

where $R_1$ is an alkyl group, $R_2$ is selected from the class consisting of the hydrogen atom and alkyl and aralkyl groups, $R_3$ is selected from the class consisting of alkyl, aralkyl allyl and hydroxyalkyl, D is the residue of a heterocyclic nitrogen nucleus usual in the cyanine dye art, A is an acid radicle and $n$ is an integer less than three, with a cyclic compound containing a methylene group rendered reactive by the ring system.

6. Process for the production of polymethine dyestuffs which comprises condensing, in the presence of a base, a compound of the general formula:

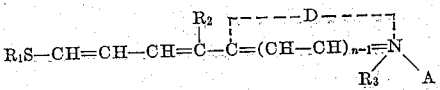

where $R_1$ is an alkyl group, $R_2$ is selected from the class consisting of the hydrogen atom and alkyl and aralkyl groups, $R_3$ is selected from the class consisting of alkyl, aralkyl allyl and hydroxyalkyl, D is the residue of a heterocyclic nitrogen nucleus usual in the cyanine dye art, A is an acid radicle and $n$ is an integer less than three, with a quaternary salt of a heterocyclic nitrogen compound containing a substituent group selected from the class consisting of methylene and amino groups in one of the $\alpha$ and $\gamma$ positions to the heterocyclic quaternary nitrogen atom.

7. Process for the production of polymethine dyestuffs which comprises condensing, in the presence of a base, a compound of the general formula:

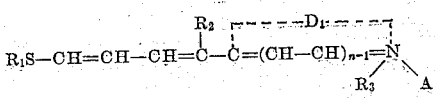

where $R_1$ is an alkyl group, $R_2$ is selected from the class consisting of the hydrogen atom and alkyl and aralkyl groups, $R_3$ is selected from the class consisting of alkyl, aralkyl allyl and hydroxyalkyl, $D_1$ is the residue of a heterocyclic nitrogen nucleus usual in the cyanine dye art, A is an acid radicle and $n$ is an integer less than three, with a compound of the general formula:

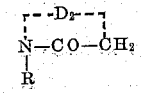

wherein $D_2$ is the residue of a heterocyclic nitrogen ketomethylene ring and R is selected from the class consisting of the hydrogen atom and hydrocarbon groups.

8. Process for the production of polymethine dyestuffs which comprises condensing a compound of the general formula:

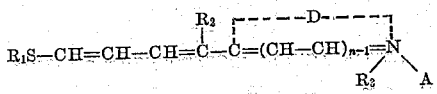

where $R_1$ is an alkyl group, $R_2$ is selected from the class consisting of the hydrogen atom and alkyl and aralkyl groups, $R_3$ is selected from the class consisting of alkyl, aralkyl allyl and hydroxyalkyl, D is the residue of a heterocyclic nitrogen nucleus usual in the cyanine dye art, A is an acid radicle and $n$ is an integer less than three, with a compound selected from the class consisting of hydrazines and substituted hydrazines.

9. Process for the production of polymethine dyestuffs which comprises condensing a compound of the general formula:

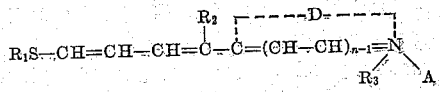

where the groups $R_1$ and $R_3$ are lower alkyl groups and the group $R_2$ is a group of the structure $-(CH_2)_{x-1}-H$ where $x$ is an integer less than 4, D is the residue of a heterocyclic nitrogen nucleus usual in the cyanine dye art, A is an acid radicle and $n$ is an integer less than three, with a cyclic compound containing a methylene group rendered reactive by the ring system.

10. Process for the production of polymethine dyestuffs which comprises condensing a compound of the general formula:

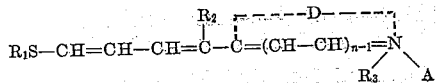

where the groups $R_1$ and $R_3$ are lower alkyl groups and the group $R_2$ is a group of the structure $-(CH_2)_{x-1}-H$ where $x$ is an integer less than 4, D is the residue of a heterocyclic nitrogen nucleus usual in the cyanine dye art, A is an acid radicle and $n$ is an integer less than three, with a quaternary salt of a heterocyclic nitrogen compound containing a substituent group selected from the class consisting of methylene and amino groups in one of the $\alpha$ and $\gamma$ positions to the heterocyclic quaternary nitrogen atom.

11. Process for the production of polymethine dyestuffs which comprises condensing a compound of the general formula:

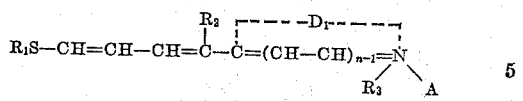

where the groups $R_1$ and $R_3$ are lower alkyl groups and the group $R_2$ is a group of the structure $-(CH_2)_{x-1}-H_1$ where $x$ is an integer less than 4, $D_1$ is the residue of a heterocyclic nitrogen nucleus usual in the cyanine dye art, A is an acid radicle and $n$ is an integer less than three, with a compound of the general formula:

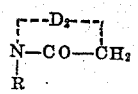

wherein $D_2$ is the residue of a heterocyclic nitrogen ketomethylene ring and R is selected from the class consisting of the hydrogen atom and hydrocarbon groups.

JOHN DAVID KENDALL.
HARRY DEREK EDWARDS.